Sept. 4, 1928.

C. O. SWENSON 1,682,864

MACHINE FOR MAKING CORRUGATED FASTENERS

Filed Oct. 9, 1924

Inventor
Carl O. Swenson
By Williams, Bradbury,
McCaleb & Hinkle
Attorneys.

Sept. 4, 1928.
C. O. SWENSON
1,682,864
MACHINE FOR MAKING CORRUGATED FASTENERS
Filed Oct. 9, 1924  4 Sheets-Sheet 3
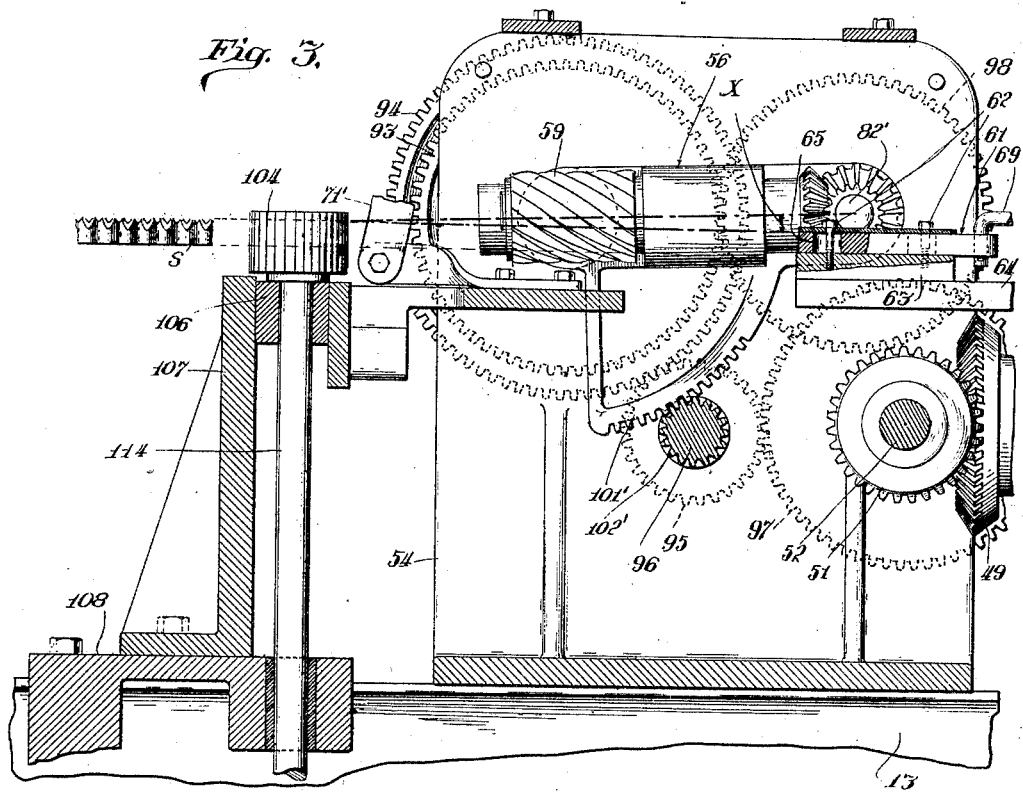
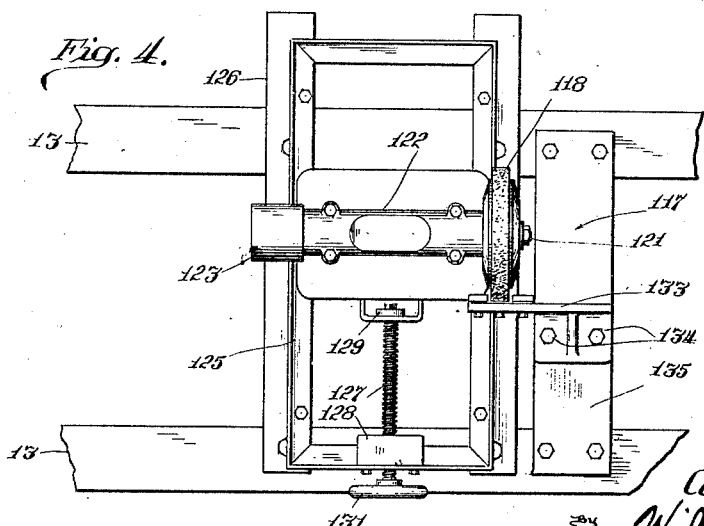
Inventor
Carl O. Swenson
By Williams Bradbury
McCaleb & Hinkle
Attorneys.

Sept. 4, 1928.
C. O. SWENSON
1,682,864
MACHINE FOR MAKING CORRUGATED FASTENERS
Filed Oct. 9, 1924     4 Sheets-Sheet 4
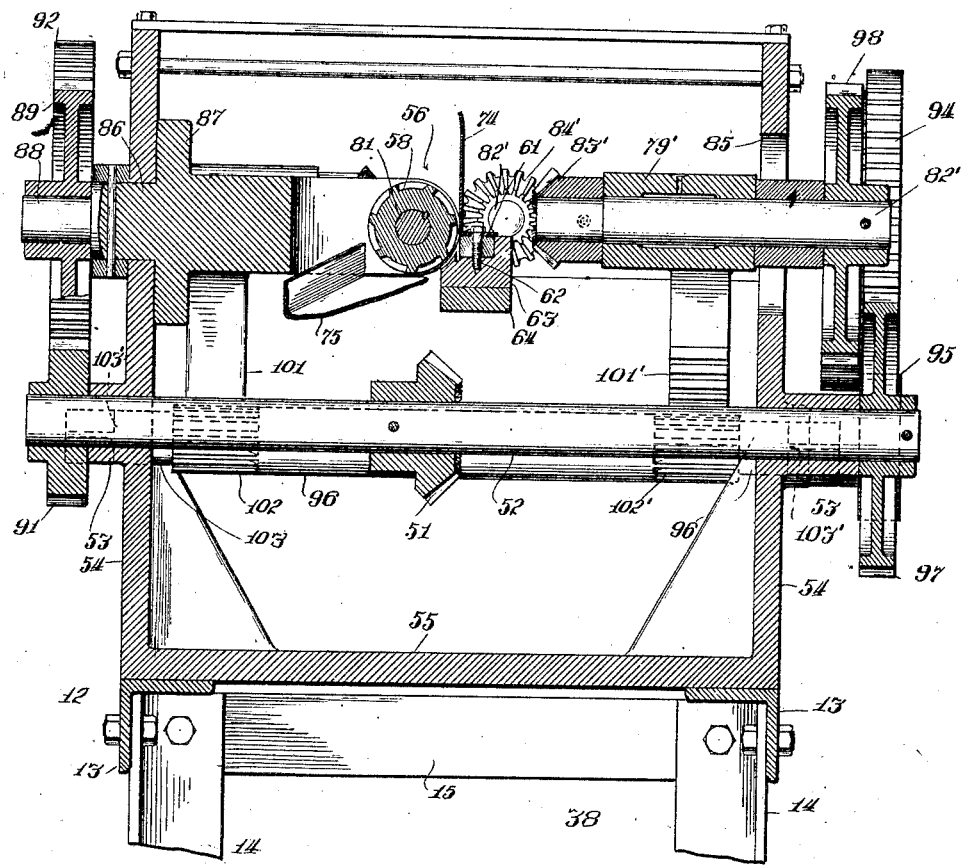
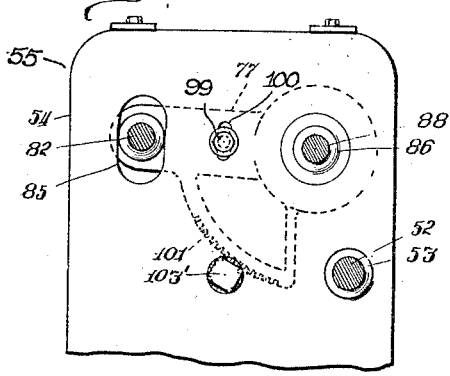
Inventor
Carl O. Swenson
By Williams, Bradbury, McCaleb & Hinkle
Attorneys.

Patented Sept. 4, 1928.

1,682,864

UNITED STATES PATENT OFFICE.

CARL O. SWENSON, OF CHICAGO, ILLINOIS, ASSIGNOR TO CONSOLIDATED STEEL STRAPPING COMPANY, OF CHICAGO, ILLINOIS, A CORPORATION OF DELAWARE.

MACHINE FOR MAKING CORRUGATED FASTENERS.

Application filed October 9, 1924. Serial No. 742,644.

My invention relates to the manufacture of corrugated saw tooth fasteners such as are used in the manufacture of door and window sashes, barrel ends, packing boxes, etc. Generally stated, my invention contemplates the provision of a machine whereby the teeth of such a fastener may be formed by a milling operation which avoids the formation of burrs, or uneven throats, between the several teeth of the fastener.

Prior inventors who have been concerned with the manufacture of corrugated saw tooth fasteners apparently have regarded the aforesaid burrs and uneven throats as unavoidable results of attempting to form the saw teeth by a milling operation. The prior art is replete with ways and means for removing or operating upon the burrs and uneven throats after the milling operation has been completed, but nowhere in the prior art do we find any machine which will mill saw teeth on a corrugated strip without leaving such burrs, uneven throats and other irregularities.

An object of the invention is to provide a machine for making corrugated fasteners in which the formation of saw teeth upon the edge of the fasteners is brought about without the presence of burrs or uneven throats at the base of the teeth at a speed sufficient to make the production of the fasteners economical commercially.

Referring to the accompanying drawings illustrating a preferred embodiment of my invention:

Figure 3 is a longitudinal sectional view, on a still larger scale, taken on the plane of line 3—3 of Figure 2;

Figure 4 is a plan view of one of the grinding wheel units which are optional additions to the machine;

Figure 5 is a transverse sectional view taken on the line 5—5 of Figure 1;

Figure 6 is a perspective view of one of the adjustable backing guides;

Figures 7 and 8 are side elevational and transverse sectional views of the finished fastener strip, and Figure 9 is a side elevational view illustrating the means for adjusting and locking the tilting cutter frames.

The machine is built around a frame 12 comprising longitudinal frame members 13 of angle section which are bolted to the upper ends of legs 14, also preferably of angle section. Cross struts 15 (Fig. 5) between these legs brace the frame transversely.

Figure 1:
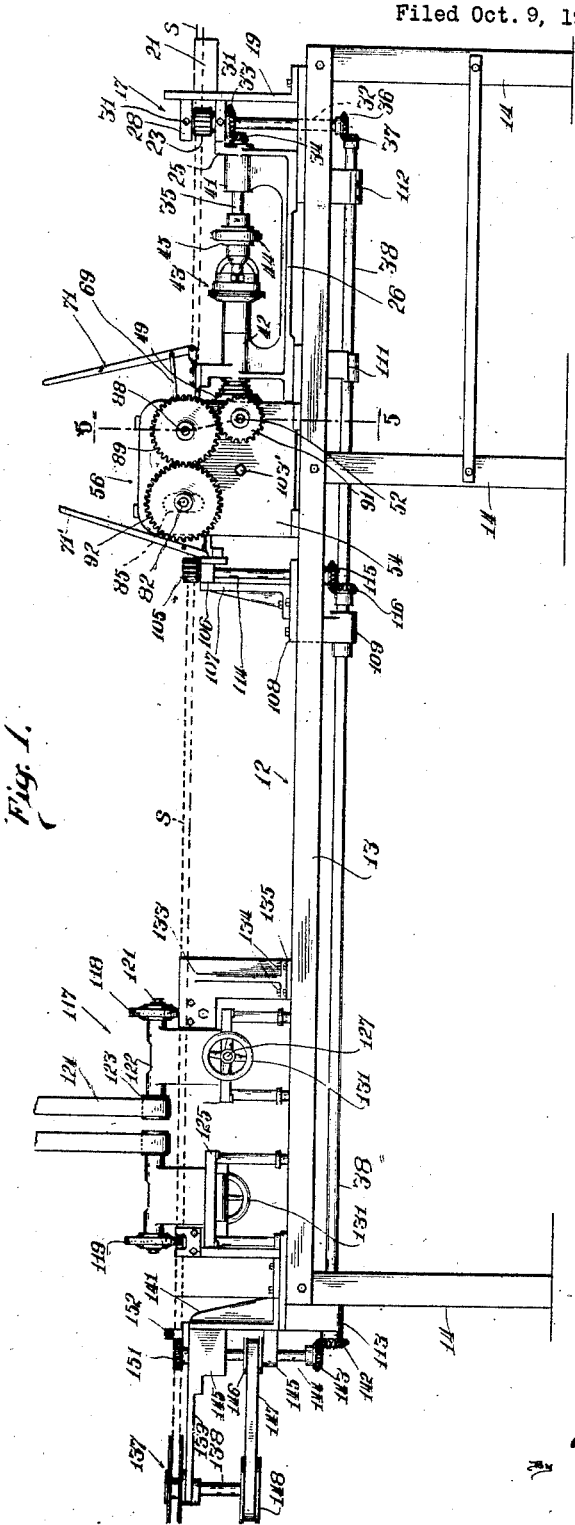
Figure 1 is a front elevational view of the entire machine.

The flat strip s, from which the corrugated fasteners are made, approaches the machine from the right-hand end, as viewed in Figure 1, where it first enters the corrugating mechanism 17. This corrugating mechanism is assembled upon a base plate 18 which is bolted at the corners to the side sills 13 of the frame. Secured to the end of this plate is an angle plate 19, suitably slotted for receiving the flat strip from the take-off reel (not shown). Projecting from the face of this plate are two cooperating guides 21 and 22, between which the strip s is drawn. The two guides are joined by screws or resilient spring means whereby different degrees of frictional tension can be exerted against the sides of the strip in its movement between the guides. This assures that the strip will be drawn between the corrugating rolls under tension and will be properly guided to these rolls.

The corrugating rolls consist of two small gears 23 and 24 which are normally spaced to have a slightly loose mesh, between which gears the strip s is fed. These two gears are journalled on the horizontal shelf portion of a bearing bracket 25 which constitutes one end of a bearing stock 26. This end of the bearing stock is supported on the plate 18, while the other end is secured to the subframe or bed of the milling mechanism.

The gear 24 has short shaft ends 24' projecting from its opposite sides, and these shaft ends are journalled in slidable bearing blocks 27. These bearing blocks are guided for transverse adjustment in guide openings in the bearing bracket 25 and in a superposed plate 28 which projects from the rear face of the angle plate 19 directly above the gears 23 and 24. Screws 31 threading through the shelf portion of the bracket and through this upper plate connect with these bearing blocks and afford adjusting means for shifting the gear 24 towards and away from the gear 23.

The gear 23 is mounted on a vertical shaft 32 which extends below the shelf portion and down through a bearing in the base plate 18. Directly below the shelf portion of the bearing bracket the shaft 32 carries a bevel gear 33 which meshes with a driving bevel pinion 34 on a shaft 35. The lower end of the vertical shaft 32 carries another bevel gear 36 which drives a bevel gear 37 mounted on a shaft 38 extending to the opposite end of the machine below the longitudinal frame members 13. This shaft 38 transmits power to a pair of toothed feeding rolls for drawing the strip through the milling mechanism and to a take-up reel, which I shall presently describe.

The portion of shaft 35 shown projecting from the bearing 41 comprises one section of a two-part shaft which is journalled in the bearings 41 and 42 of the bearing stock 26. Interposed between the two sections of the shaft is a suitable type of clutch 43 for interrupting the drive to the corrugating rolls, to the feeding rolls and to the take-up reel. A yoke 44 having pins bearing in a conventional clutch collar 45 serves to actuate the clutch. Extending from the yoke is an operating lever 46 (Fig. 2) having pivotal connection at its outer end with an operating link 47 extending to a control lever located at any convenient point of operation. This point of operation is preferably adjacent the left-hand end of the machine in proximity to the take-up reel, where the operator can observe the condition of the finished strip.

As shown in Figures 1 and 3, the left-hand end of the clutch shaft 35 has mounted thereon a bevel gear 49 which meshes with a smaller bevel gear 51 on a transverse power shaft 52. This power shaft is supported in bearing hubs 53 in the side walls 54 of a sub-frame 55. A pulley 57 on the rear end of the power shaft 52 receives the driving belt. As shown in Figure 5, the sub-frame 55 is of U-shaped section, suitably secured to the longitudinal frame members 13, and assembled on this sub-frame is the milling mechanism 56.

The milling mechanism 56 comprises two milling cutters 58 and 59 which mill off the upper edge of the corrugated strip on the opposite sides thereof. In being presented to the first milling cutter 58, the strip is drawn between this milling cutter and a backing guide 61. This backing guide is secured by cap screws 62 to a sturdy supporting block 63 which has a relatively wide plate extension 64 rigidly secured to the top of an extension on the bearing standard 42 (Fig. 1). The backing guide or bar 61 is illustrated in detail in Figure 6, from which it will be noted that it has guide slots 65 for receiving the two guide screws 62. The working face of the backing member 61 is always maintained in parallelism with the cutting face of the cutter 58, the opposite face of the backing member being sloped, however, at an angle to this working face. The backing member is supported in a right angle recess in the top of the block 63, as shown in Figure 5, and the vertical wall of this recess is sloped correspondingly to the rear face of the backing member, so that as the backing member is shifted in this guide recess its front working face will be advanced towards, or will be allowed to retract from, the cutting face of the milling cutter 58, always remaining in substantial parallelism with this cutting face. If desired, the outer end of the backing member 61 may be provided with a stop shoulder 67 adapted to abut the end of the block 63 and limit the inward movement of the backing member. An eye 68 in the outer end of the backing member is adapted to have pivotal connection through a link 69 with an operating lever 71. The lower end of this operating lever is pivotally supported on a bracket 72 bolted to the plate extension 64 and to the bearing extension 42. By the provision of this operating lever 71 a greater leverage can be exerted on the backing member for shifting the same backwardly or forwardly in its inclined guide recess, whereby this backing member can be shifted with the machine in operation or with the corrugated strip confined between the backing member and the cutter teeth. After each adjustment, the cap screws 62 are, of course, screwed down tight to clamp the backing member in this adjusted position.

Rising from the working face of the backing member 61 is a sheet metal plate 74. The lower edge of this plate is formed with a right angle flange which is apertured for receiving the cap screws 62 passing down through the backing member 61. This plate prevents any of the cuttings from being thrown over the backing member 61 and into gearing on the rear side of this backing member; and this plate also avoids any possibility of the strip working upwards and slipping over the top of the backing member 61. Suitably supported directly below the cutter 58 is an inclined chute 75 for conducting the cuttings away from the gearing and other working parts of the machine.

The cutter 58 performs one-half of the entire milling operation, milling off the left side of the upper edge of the strip, as viewed in Figure 5. From this first cutter 58 the strip is fed to the second cutter 59, which is positioned on the opposite side of the strip, to mill off the right-hand side of this upper edge. This secondary cutter 59 has a duplicate arrangement of backing member 61' similarly mounted so that its endwise shifting movement will move the working face thereof towards or away from the cutter 59. The mounting of this secondary backing member 61' will be obvious from the foregoing description. The member is similarly actuated through a link 69' and operating lever 71'. A diagonal chute 75' conducts the scrap or cuttings away from this secondary cutter.

Each cutter is journalled in an individual bearing frame, by the tilting of which the angle of the cutter relative to the edge of the strip can be varied. The revolvable bearing frames for both cutters are very similar, the two merely occupying reversed positions upon the opposite sides of the strip. Hence a description of one of these bearing frames will suffice for both. Each frame 77 or 77' has a longitudinal bearing extension 78 and a transverse bearing extension 79. In the longitudinal bearing extension 78 is journalled the arbor 81 of its respective milling cutter. In the transverse bearing extension is journalled the transverse drive shaft 82 which is geared to the arbor 81 through the two bevel gears 83 and 84. The outer end of the transverse drive shaft 82 extends out through an enlarged opening or slot 85 in the adjacent side wall of the sub-frame, this opening being of appropriate size or shape to permit the tilting of the sub-frame. This tilting occurs around an axis which passes through or in proximity to the axis of the cutter, as shown in Figure 3. The frame swings about a stub shaft 86 which projects laterally from the bearing frame through a bearing opening in the adjacent side wall 54. An enlarged collar portion 87 bearing against the inner side of the side wall serves as an effectual guide for the swinging motion of the bearing frame. It is preferable that the axis of the stub shaft 86 intersect the axis of the cutter, and preferably at a point midway of the length of the cutter, although this may be departed from if desired.

Each stub shaft 86 has a reduced outer end 88 on which are journalled idler spur gears for transmitting a drive to their respective cross shafts 82 and 82'. On the stub shaft 88 for the first milling cutter 58 is journalled a gear 89 which meshes with a smaller spur gear 91 fixed to the front projecting end of the power shaft 52. The large spur gear 89 transmits the power derived from the gear 91 to a third gear 92 on the transverse drive shaft 82. This gear 92 swings with the tilting movement of the frame 77 around the axis of the stub shaft 86, and thus a continuous driving relation is maintained between the gears 91 and 92 during the tilting of the bearing frame 77.

Mounted for free rotation on the reduced end 88' of the other stub shaft 86' are two gears 93 and 94 which are rigidly joined together. The outer gear 94 meshes with an idler gear 95 supported on a cross shaft 96 in the side wall of the sub-frame, and this idler gear in turn meshes with a spur gear 97 on the power shaft 52. The drive thus obtained through the foregoing arrangement of gears is thence transmitted through gear 93 to a gear 98 which is mounted on the outer end of transverse drive shaft 82'. As with the first bearing frame 77, this geared relation enables the secondary bearing frame 77' to be tilted at any time without interrupting the driving connection to the cutter 59.

The tilting of each bearing frame is secured through a segment gear 101 cut in an arcuate depending portion formed integrally with the lower side of each bearing frame. The cross shaft 96 on which the idler gear 95 is journalled extends through the right-hand side wall 54 of the sub-frame (Fig. 5) and carries a spur gear or has gear teeth 102' formed therein which mesh with the segment 101'. In the opposite wall 54 of the sub-frame is another stub shaft 103 having gear teeth 102 which mesh with the segment gear 101 of the first cutter frame. The stub shafts 96 and 103 each have squared ends 103' for the reception of a suitable wrench. By the rotation of these stub shafts the angular position of either or both milling cutters relative to the edge of the strip can readily be adjusted. Such adjustment may be for obtaining a more effective angle of cutting for a smoother cut, or for presenting another portion of the cutter face to the strip after one portion has become dulled. For locking each bearing frame in its adjusted position, a cap screw or bolt 99 is extended outwardly from the bearing frame through an arcuate slot 100 in the side wall 54 of the sub-frame 55. By tightening this screw, or the nut thereon, the tilting frame is rigidly clamped in position.

Figure 2:
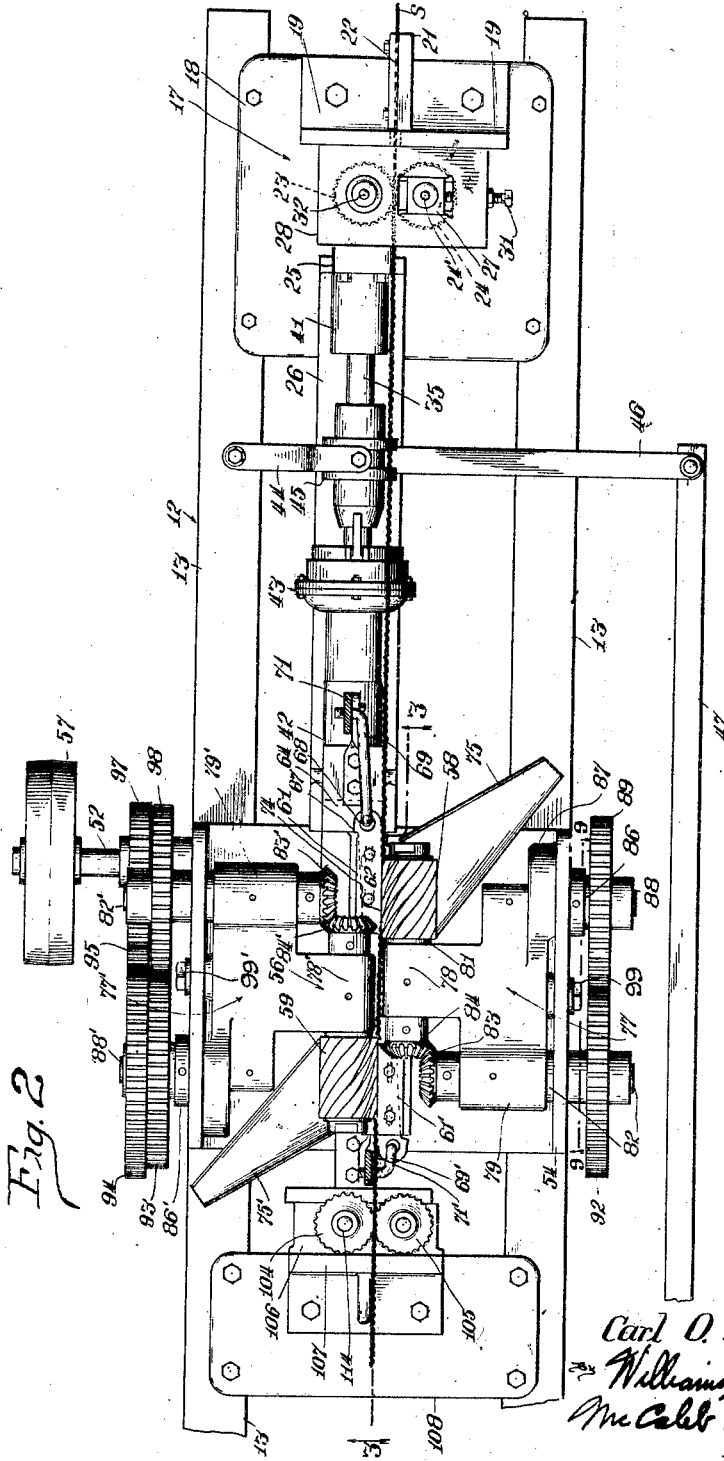
Figure 2 is a plan view, on a larger scale, of the corrugating and milling apparatus at the right-hand end of the machine.

It will be seen from Figure 2 that in horizontal plan the axis of each cutter and its cutting face lie in a plane or planes substantially parallel with the vertical side of the strip or its course of travel past the cutter. By thus disposing the cutter, the cutting edges of the tool traverse a circular path which intercepts the strip edgewise. In their downward sweep the cutter teeth successively engage the strip at a point in or beyond the median plane of the edge thereof and leave or disengage the strip at one side and between the edges thereof. This disposal of the cutter takes advantage of the ability of a corrugated strip to withstand transverse stress and incidentally produces a "hollow" cut in the strip, leaving sides of slightly concave profile, as shown in Figure 8. Such a cut results in sharper tooth points and assists in avoiding burrs and uneven throats. This disposal and direction of rotation of the cutter also results in the cutter teeth completing their shearing operation or breaking contact with the strip down below the bottoms of the throats along the side of the strip, which also aids in avoiding burrs or other unevenness in the throats $j$ at the points $k$. Moreover, by virtue of such positioning of the cutter a relatively long length of the cutter face is active in removing material.

While this disposal of the milling cutter in a plane parallel with the vertical plane of the strip has the several advantages described above, nevertheless such disposal of the cutter is not successful to the degree desired without another important setting of the cutter, constituting part of the present invention. This latter setting is the disposal of the axis of the cutter at a slight angle to the horizontal line of the strip edge, and with the trailing end of the cutter pointing in the direction of travel of the strip. This is indicated by the angle $x$ in Figure 3. In experiments conducted with the axis of the milling cutter aligned horizontally or parallel with the edge of the strip the results were not successful to the degree obtained from tilting the cutter substantially as shown. In actual practice this tilting is comparatively small, ranging from 2 to 4 degrees. By virtue of the mounting of the cutters on the tiltable bearing frames, the angle of each cutter can be separately adjusted to any desired degree which may be found to give the smoothest cut. The reason why this vertical inclination is desirable or necessary appears to be because if the cutter were parallel with the strip edge the first cutter tooth would have to remove all of the material cut from the strip, whereas by inclining the cutter as shown each successive cutter tooth makes successive shallow cuts and thus removes the material in small amounts.

From this milling mechanism 56 the strip is led between a pair of toothed feeding rolls 104 and 105 located just posterior to the milling mechanism in the line of travel of the strip. The two rolls have bearing support in a transverse bearing member 106 supported at the top of a bracket 107. This bracket is bolted to a transverse plate 108, which in turn is secured to the longitudinal frame members 13. Depending from the plate 108 is a bearing 109 (Fig. 1) for supporting the lower line shaft 38. A pair of bearings 111 and 112 support the right-hand end of this shaft and a fourth bearing 113 at the end of the frame supports the left-hand end of the shaft. Extending down from the corrugating roll 104 is a vertical shaft 114 which carries a bevel gear 115 at its lower end meshing with another bevel gear 116 on the shaft 38. The feeding rolls 104 and 105 are thus driven in cynchronism with the first pair of rolls 23 and 24, so that each pair will have the same feeding speed for the strip. The secondary pair of rolls 104 and 105 has the twofold function of securing a timed positive feed of the strip past the two milling cutters, and of reforming and completing any corrugations which may have become slightly flattened.

The milling operations described above produce a strip which is sufficiently finished and devoid of burrs, uneven throats, etc. for all practical uses. However, as illustrative of a further step in the sequence of operations, which step I consider entirely optional, it may be preferred by some manufacturers or in some instances to subject the milled strip to a further grinding operation performed by suitable grinding wheels. This grinding operation will polish the milled sides of the strip and sharpen the tooth points and other cutting edges of the strip. Where the strip as milled by the milling mechanism 56 is to be employed as the finished product, it is led directly to a take-up reel 137 (which I shall hereinafter describe), but where the optional step of grinding the strip is to be employed this grinding mechanism is interposed between the milling mechanism and the take-up reel.

Such grinding mechanism is illustrated at 117, and comprises two grinding wheels 118 and 119 mounted for engaging the opposite milled edges of the strip. The mountings for the two grinding wheels are substantially identical, being merely reversed for occupying positions on opposite sides of the strip, and accordingly I shall describe only one of these mountings in detail. The grinding wheel 118 is fixed on the end of an arbor 121 which has bearing support in an upright bearing standard 122. A belt pulley 123 on the other end of the arbor receives power through a belt 124 from an electric motor or suitable line shafting above. The standard 122 has guided support in a guide frame 125 which is suitably supported on cross members 126 secured to the longitudinal frame members 13. A lead screw 127 screws through a bearing block 128 on the end of the guide frame and has operative connection at 129 with the shiftable bearing standard 122, so that, by operation of the outer hand wheel 131, the grinding wheel 118 can be advanced towards or moved away from the milled strip. During this grinding operation the strip is confined between two guide plates 132 and 133 which hold the strip against lateral and downward displacement. The guide plate 132 is suitably bolted to the guide plate 133 and has a notch cut therein for receiving the face of the grinding wheel 118. The guide 133 is bolted at 134 to a transverse plate 135 secured to the frame members 13, so that the strip will be guided in a fixed path, relative to which the grinding wheel 118 can be advanced or retracted.

The circular cut made by the wheels 118 and 119 cooperates with the angle of disposal of the milling cutters in that this cut tends to "hollow" grind the "hollow" cut made by the milling cutters. This grinding operation is continuous, not requiring any intermittent stopping and starting of the strip, and hence it does not slow up the operation of the machine.

From the second grinding wheel 119, the strip is led to the take-up reel 137 supported out from the end of the machine. The take-up reels are adapted for detachable mounting on the upper end of a drive shaft 138 which is journalled in a bearing arm 139 projecting from a bracket 141 bolted to the end of the machine. A bevel gear 142 on the end of the lower line shaft 38 meshes with another bevel gear 143 on the lower end of a vertical shaft 144 journalled in bearings 145 projecting from the bearing bracket 141. A belt pulley 146 on the shaft 144 intermediate these bearings receives a belt 147 which tracks over another pulley 148 on the lower end of the shaft 138. The slippage afforded through this belt drive compensates for the varying diameters of strip on the reel as the strip is wound thereon. The upper end of the shaft 144 may drive one of another pair of toothed feeding rolls 151 for positively drawing the strip past the grinding wheels 118 and 119. A guide roller 152 may be provided for confining the strip against upward displacement to compel it to pass between the feeding rolls 152 and in proper line to the reel 137.

The operation of the machine in its entirety will be obvious from the foregoing description of each of its component parts.

I do not intend to be limited to the particular details of the specific embodiment herein shown and described, it being apparent that this specific embodiment is merely an exemplification of the essence of the invention.

I claim:

1. In a machine of the class described, the combination of means for guiding a portion of a corrugated strip in a substantially rectilinear path, and a milling cutter acting on said strip in said rectilinear path and having its axis disposed parallel to the plane of said path and inclined in a vertical direction.

2. In a machine of the class described the combination of stationary guide means for guiding a portion of a corrugated strip, and a milling cutter engaging said guided portion, said milling cutter having its axis extending parallel to the plane of said guided portion and inclined in a vertical direction.

3. In combination, means for guiding a corrugated strip, and a milling cutter acting on said strip and having its axis extending substantially parallel to the side of the strip, the axis of said milling cutter being inclined to the edge of said strip.

4. In a machine of the class described, the combination of means for guiding a portion of a corrugated strip in a substantially rectilinear path, and a milling cutter disposed with its axis parallel to the plane of an edge of the strip and inclined at an angle to said edge of the strip.

5. In a machine of the class described, the combination of means for guiding a corrugated strip, and a milling cutter acting on the strip disposed with its axis in a plane parallel to the edge of the strip, said cutter axis being inclined at an angle to the edge of the strip with the trailing end of the cutter inclined towards the strip.

6. In a machine of the class described, the combination of means for guiding the strip, and a milling cutter extending in the direction of travel of said strip and having its axis in a plane parallel to the side of said strip, but having its axis inclined at an angle to the edge thereof, the leading end of said cutter being inclined away from said strip.

7. In mechanism for milling the edge of corrugated fastener strip, the combination of means for feeding the strip, a milling cutter, and means for tilting said cutter around an axis extending transversely of the cutter and transversely of the strip.

8. In mechanism for milling the edge of corrugated fastener strip, means for guiding the strip through a predetermined path, a milling cutter, a bearing frame for said cutter, means for driving said cutter through said bearing frame, and a pivotal support for said bearing frame permitting pivotal movement thereof including the axis of said cutter in a plane substantially parallel with the path of said fastener strip.

9. In mechanism for milling the edge of corrugated fastener strip, the combination of means for guiding the strip through a predetermined path, pivotal supports on each side of said path, bearing frames pivotally supported on each of said supports, a milling cutter mounted on each side of said predetermined path, said cutters being disposed with their axes in a plane parallel to the edge of the strip, and means for driving each of said milling cutters through its respective bearing frame.

10. In mechanism for milling the edge of corrugated fastener strip, the combination of means for guiding the strip through a predetermined path, a separate bearing frame on each side of said predetermined path, milling cutters supported by each of said frames for cutting the opposite sides of the strip, and means for driving said cutters through said bearing frames, said bearing frames having pivotal support for pivotal movement in planes parallel to the plane of said predetermined path.

11. In a machine of the class described, the combination of a frame comprising side supporting members, means for guiding the fastener strip through a predetermined path between said supporting members, individual bearing frames on each side of the strip, stub axles pivotally mounting said bearing frames to said supporting members for pivotal movement in planes parallel with said predetermined path, individual milling cutters journalled in each of said bearing frames, a drive shaft projecting from each of said bearing frames operatively connected to its respective milling cutter, gears on each of said drive shafts, gears on said stub shafts meshing with said first-named gears, and means for driving the gears on said stub shafts.

12. In a machine of the class described, the combination of corrugating mechanism, milling mechanism, a take-up reel, driving means for driving said milling mechanism, transmission means operatively connecting said corrugating mechanism and said take-up reel, means comprising a shaft operatively connecting said transmission means with said driving means, and a clutch interposed in said shaft for simultaneously interrupting the transmission of power to said corrugating mechanism and to said take-up reel.

13. In a machine of the class described, the combination of a first pair of toothed rolls for corrugating the strip, milling mechanism for milling the edge of the strip, a second pair of toothed rolls for drawing the strip through said milling mechanism, a take-up reel, transmission mechanism operatively connecting said first pair of toothed rolls, said second pair of toothed rolls and said take-up reel for simultaneous rotation, a drive shaft for driving said milling mechanism, and a clutch operatively connecting said drive shaft with said transmission mechanism for concurrently interrupting the transmission of power to said first and second pairs of toothed rolls and said take-up reel.

14. In a machine of the class described, the combination of means for guiding a corrugated strip and a milling cutter acting on the strip disposed with its axis in a plane parallel to the edge of the strip, said cutter being inclined from the edge of the strip so that the cutting of the strip as it engages the cutter gradually increases in depth as the strip moves toward the cutter.

In witness whereof, I hereunto subscribe my name this 17th day of September, 1924.

CARL O. SWENSON.